United States Patent
Beischer et al.

(10) Patent No.: US 9,912,095 B2
(45) Date of Patent: Mar. 6, 2018

(54) ENVIRONMENTALLY SEALED PLUG-IN CONNECTOR HOUSING

(71) Applicant: Harting Electric GmbH & Co. KG, Espelkamp (DE)

(72) Inventors: Thomas Beischer, Espelkamp (DE); Jens Horstmann, Espelkamp (DE)

(73) Assignee: HARTING ELECTRIC GMBH & CO. KG, Espelkamp (DE)

( * ) Notice: Subject to any disclaimer, the term of this patent is extended or adjusted under 35 U.S.C. 154(b) by 50 days.

(21) Appl. No.: 14/758,646

(22) PCT Filed: Dec. 12, 2013

(86) PCT No.: PCT/DE2013/100419
§ 371 (c)(1),
(2) Date: Jun. 30, 2015

(87) PCT Pub. No.: WO2014/106504
PCT Pub. Date: Jul. 10, 2014

(65) Prior Publication Data
US 2015/0357746 A1    Dec. 10, 2015

(30) Foreign Application Priority Data

Jan. 3, 2013 (DE) .................. 10 2013 100 028

(51) Int. Cl.
*H01R 13/52* (2006.01)
*F16J 15/06* (2006.01)
(Continued)

(52) U.S. Cl.
CPC ......... *H01R 13/5202* (2013.01); *F16J 15/061* (2013.01); *F16J 15/104* (2013.01); *H01R 13/748* (2013.01)

(58) Field of Classification Search
CPC .............. H01R 13/5202; H01R 13/5219; F16J 15/021; F16J 15/025; F16J 15/061; F16J 15/10; F16J 15/104; H02G 3/088
(Continued)

(56) References Cited

U.S. PATENT DOCUMENTS 2,058,010 A * 10/1936 Fitch .................. F16J 15/02
277/649
4,067,531 A    1/1978 Sikula
(Continued)

FOREIGN PATENT DOCUMENTS

CN    200972959    11/2007
DE    202004017562    1/2005
(Continued)

*Primary Examiner* — Nicholas L Foster
(74) *Attorney, Agent, or Firm* — Jacobson Holman, PLLC.

(57) ABSTRACT

The invention relates to an environmentally sealed plug-in connector housing formed from a base body (2) having a fastening flange (10) molded thereon. The fastening flange (10) is associated with a sealing element (20) that is compressed in a sealing manner between the fastening flange (10) and an assembly surface (3). In order to ensure the sealing of fastening bores (11) provided in the fastening flange (10), sealing sleeves (21) are molded onto the sealing element (20), which sealing sleeves extend into the fastening bores (11) and at least completely pass through the latter. A fastening screw inserted into a fastening bore (11) can in this way seal with its screw head the fastening bore (11) by means of the sealing sleeve (21) that is compressed by the screw head.

12 Claims, 5 Drawing Sheets

(51) Int. Cl.
*F16J 15/10* (2006.01)
*H01R 13/74* (2006.01)

(58) Field of Classification Search
USPC .......................................................... 277/640
See application file for complete search history.

(56) References Cited

U.S. PATENT DOCUMENTS

| | | | |
|---|---|---|---|
| 4,832,551 A | 5/1989 | Wollar | |
| 5,107,900 A | 4/1992 | Sugimura | |
| 7,765,976 B2 | 8/2010 | Salameh et al. | |
| 2005/0127616 A1* | 6/2005 | Dorniok | F16J 15/061 277/628 |
| 2005/0225039 A1* | 10/2005 | Seki | F16J 15/061 277/637 |
| 2006/0101563 A1* | 5/2006 | Meier | F16L 23/18 4/252.1 |
| 2006/0141858 A1* | 6/2006 | Phung | H01R 13/5202 439/557 |
| 2007/0235947 A1 | 10/2007 | Meier et al. | |
| 2008/0197697 A1* | 8/2008 | Naganuma | B60T 8/3675 303/119.2 |
| 2009/0255703 A1* | 10/2009 | Vigorito | H02G 3/081 174/67 |

FOREIGN PATENT DOCUMENTS

| | | |
|---|---|---|
| DE | 202004017562 | 3/2005 |
| DE | 10357881 | 7/2005 |
| DE | 102007020160 | 10/2008 |
| EP | 1617067 | 1/2006 |
| EP | 2107280 | 10/2009 |
| EP | 2503232 | 9/2012 |
| JP | H03244801 | 10/1991 |
| JP | H1064630 | 3/1998 |
| JP | H10144386 | 5/1998 |
| JP | 2009250272 | 10/2009 |
| JP | 2011198513 | 10/2011 |
| SU | 453502 | 1/1975 |
| WO | WO 89/08212 | 9/1989 |
| WO | WO 2005/121611 | 12/2005 |

\* cited by examiner

ENVIRONMENTALLY SEALED PLUG-IN CONNECTOR HOUSING

The invention relates to a plug-in connector housing having a base body and a fastening flange molded thereto.

Such plug-in connector housings are needed so as to be fixed to the assembly surfaces of housings or devices. They can be used to establish a connection with the housing or device by means of a matching plug-in connector. Plug-in connector housings of this type ensure a sealing of the plug-in connection for example with sensitive components or contact parts against external industrial environments.

It is well known to secure housings that can be assembled and are provided with a flange against environmental effects using a seal that is associated with the flanges.

However, when doing so it is not ensured that the screw connection that is used to fix the flange is also environmentally sealed in the area of the feedthroughs between the screw, the seal and the flange.

PRIOR ART

DE10357881A1 shows a seal to be disposed between sealing surfaces facing one another, in particular a flange seal, for a housing flange provided on a housing and a correspondingly formed assembly wall, which flange seal has a baseplate with an external peripheral collar that has at least one panel integrally moulded thereto at a distance above the baseplate, which panel forms, together with the base surface lying there below, at least one pocket, wherein openings located above one another in the pocket are provided, with at least one of these openings having a sealing lip.

What is of disadvantage here is that the proposed seal does not achieve the desired effect because the integrally moulded panel is distorted in the process of screwing in a screw and is as a result destroyed. Thus, a sufficient sealing of the screw connections is not ensured.

Other solutions known from the prior art also always have the problem that a sufficient sealing effect is not achieved in the area of the screw connections.

A further disadvantage of the plug-in housings with seals as known from the prior art is that seals that are not integrally moulded or glued on will deform as a result of excessive pressure acting on them during the assembly process. This may go so far that the seal between the housing and the assembly surface is pushed away and no sealing effect can develop.

OBJECT OF THE INVENTION

It is the object of the invention to develop a plug-in connector housing in such a way that a sufficient sealing against environmental effects is ensured.

This object is achieved the features recited in the claims set forth herein.

The invention relates to a plug-in connector housing as is basically already known from the prior art. It consists of a base body for receiving plug-in and/or insulating bodies with contact pins and/or sockets contained therein. The base body has a plug-in side that is provided for contacting a corresponding plug-in connector and that can, if needed, be latched thereto.

The plug-in side of the base body as well as the components received in the base body will not be described herein in any more detail. In this connection, many embodiments are known from the prior art which have no further influence on the present invention and are correspondingly exchangeable.

Moreover, the base body has an assembly side on which a fastening flange is provided. The fastening flange may here be formed to be integral with the base body or may be separately fixed thereto. Such fastening flanges are also already known from the prior art. Advantageously, fastening bores are provided in the fastening flange, by means of which the fastening flange can be screwed together with an assembly surface.

Assembly is preferably carried out using screws. However, also other assembly types such as e.g. riveting as known from the prior art are possible. For the sake of simplification, the following text is merely based on a screw connection, and here also any functionally similar connection types are contemplated.

Expediently, a sealing element is provided between the fastening flange and the assembly surface. This sealing element is compressed there-between by fastening the plug-in connector housing on the assembly surface and in this way achieves a sealing effect.

According to the Invention, the sealing element has at least one sealing sleeve. Advantageously, the number of sealing sleeves matches the number of fastening bores in the fastening flange. The sealing sleeves, which like the sealing element preferably consist of an elastic sealing material, are each associated with a fastening bore.

According to the present invention, each of the sealing sleeves at least completely passes through a fastening bore. If the sealing element completely rests against the fastening flange, the sealing sleeves thus protrude from the fastening bore at least by a small amount.

The projection of the sealing sleeves is to be dimensioned preferably in a range of 0.05 mm to 1.0 mm, more preferably in a range of 0.1 mm to 0.5 mm, most preferably in a range of 0.2 mm to 0.4 mm.

The purpose of the projection of the sealing sleeves is a direct sealing of screws that are used for mounting the plug-in connector housing to an assembly surface.

In this process, the projection is pressed together during tightening and is thus pressed radially outwards. Accordingly, the projection of the sealing sleeves deforms in such a way that it effects a sealing between the screw and the fastening flange.

In order to delimit the compression/pressing of the sealing element and to avoid destruction of the latter, a restriction for the compression travel is moreover provided. To this end, a peripheral collar is associated with the fastening flange. The peripheral collar surrounds the sealing element at least in sections.

The height of the collar is here less than the thickness of the sealing element. As a result, the sealing element extends at least partially over the collar. However, the sealing element can only be compressed by the difference by which the sealing element extends over the collar.

Further advantageous embodiments of the plug-in connector housing are indicated in the dependent claims.

EMBODIMENT EXAMPLE

An embodiment example of the invention is shown in the figures and will be explained in more detail below, wherein.

Figure 1:
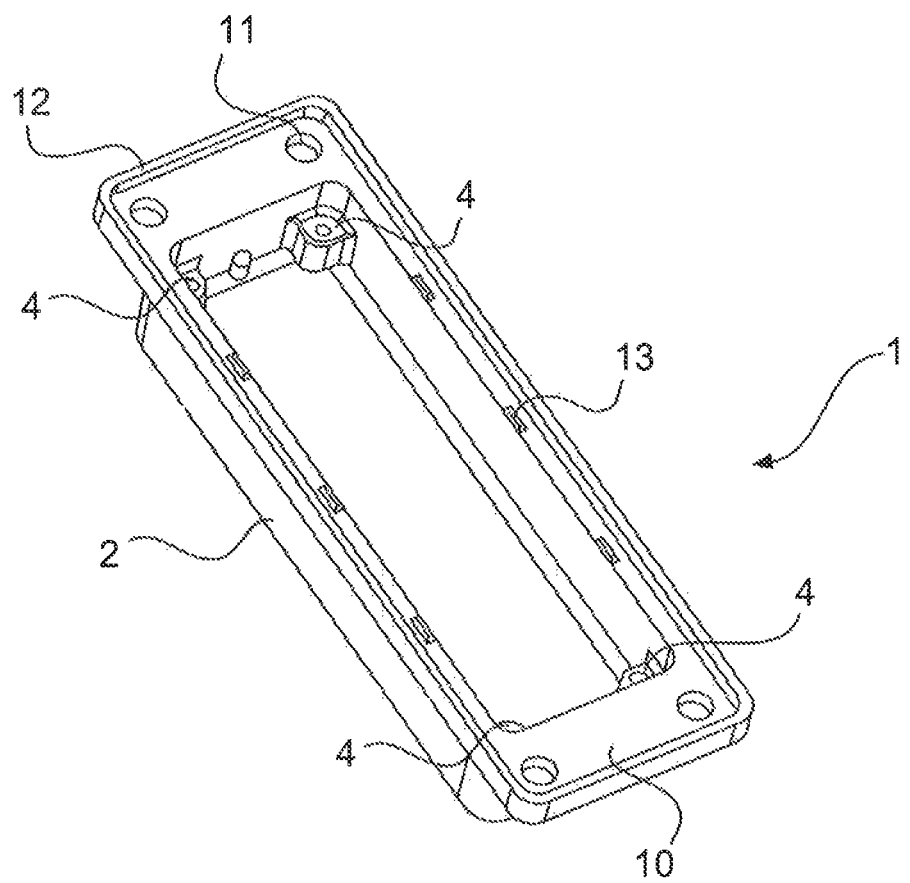
FIG. 1 shows a plug-in connector housing in a three-dimensional view.

FIG. 1 shows a plug-in connector housing 1 according to the invention in a three-dimensional view. The plug-in connector housing 1 is formed by a base body 2 and a fastening flange 10. The base body 2 is formed to be substantially hollow and is provided for receiving plug-in connector components.

The plug-in connector components may here be insulating bodies, modular reception frames or similar parts of a plug-in connector as known from the prior art. For fastening the plug-in connector components, a plurality—here four—of fastening receptacles 4 are provided in the base body 2, to which inserted components may be fastened.

Moreover, the base body 2 has an opening on each of two sides. One opening, shown here at the bottom, is used for contacting the plug-in connector housing 1 with a mating plug-in connector. The plug-in connector components inserted in the base body 2 protrude, in the assembled condition, into this opening so as to come into contact with the components of a mating plug-in connector.

As shown at the top of FIG. 1, the base body 2 has a second opening that is used for passing on wires connected to the received plug-in connector components. These may be passed into a device or housing via the second opening.

On the side of the second opening, the base body 2 has the fastening flange 10, which expediently surrounds the second opening, through which wires are passed.

The fastening flange 10 is provided with a plurality of fastening bores 11, by means of which the fastening flange 11 can be fastened to an assembly surface 3 using screws or similar fastening means. In this embodiment, four fastening bores are provided in the fastening flange.

According to the invention, the fastening flange 10 has a peripheral collar 12, which extends once along the edge of the fastening flange 10. Embodiments with a collar 12 that does not extend round completely are also conceivable. According to the invention it is not necessary for the collar 12 to extend round completely. Also collar segments that are used as support points for the assembly are conceivable.

Moreover, according to the invention a plurality of cams 13 are moulded onto the fastening flange 10. The cams 13, here six, are provided for fixing a sealing element 20 that is provided between the fastening flange 10 and an assembly surface 3.

According to the invention, both the collar 12 and the cams 13 are located on the side of the fastening flange 10 that faces away from the base body 2.

Figure 2:
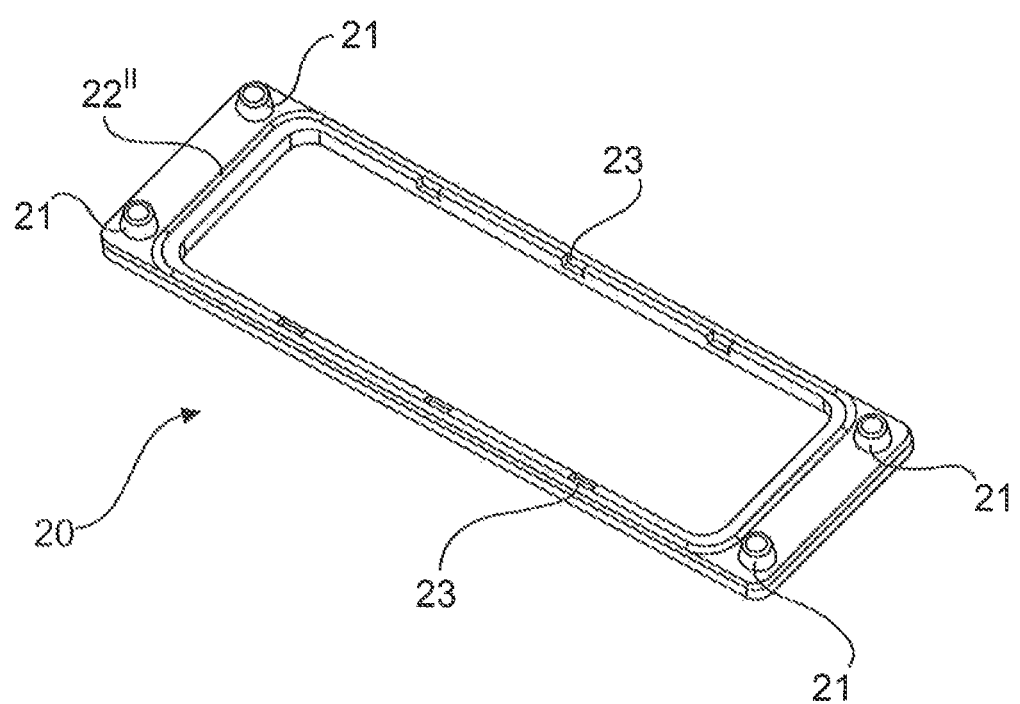
FIG. 2 shows a sealing element in a three-dimensional view.

FIG. 2 shows a sealing element 20 according to the invention in a three-dimensional view. The flat element made from an elastic material having a sealing function has approximately the shape of the fastening flange 10.

According to the invention, the surface of the sealing element 20 that faces the fastening flange 10, here visible, has a plurality of sealing sleeves 21. The sealing sleeves 21, here four in correspondence with the fastening bores 11, are orientated such that they are aligned with the fastening bores 11 of the fastening flange 10.

When the sealing element 20 is placed against the fastening flange 10, each of the sealing sleeves 21 passes through its associated fastening bore 11.

In order to achieve an improved sealing between the fastening flange 10 and the sealing element 20, a sealing lip 22" is additionally moulded onto the sealing element 20. The sealing lip 22" extends continuously around the opening for feeding through wires and for sealing the gap between the fastening flange 10 and the sealing element 20.

In order to prevent the sealing element 20 from sliding during the assembly of the plug-in connector housing 1 on an assembly surface 3, recesses 23 are additionally moulded into the sealing element 20. The recesses 23 are provided for receiving the cams 13 of the fastening flange. As a result, any sliding of the sealing element 20, especially in the thin-walled areas, is prevented.

Figure 3:
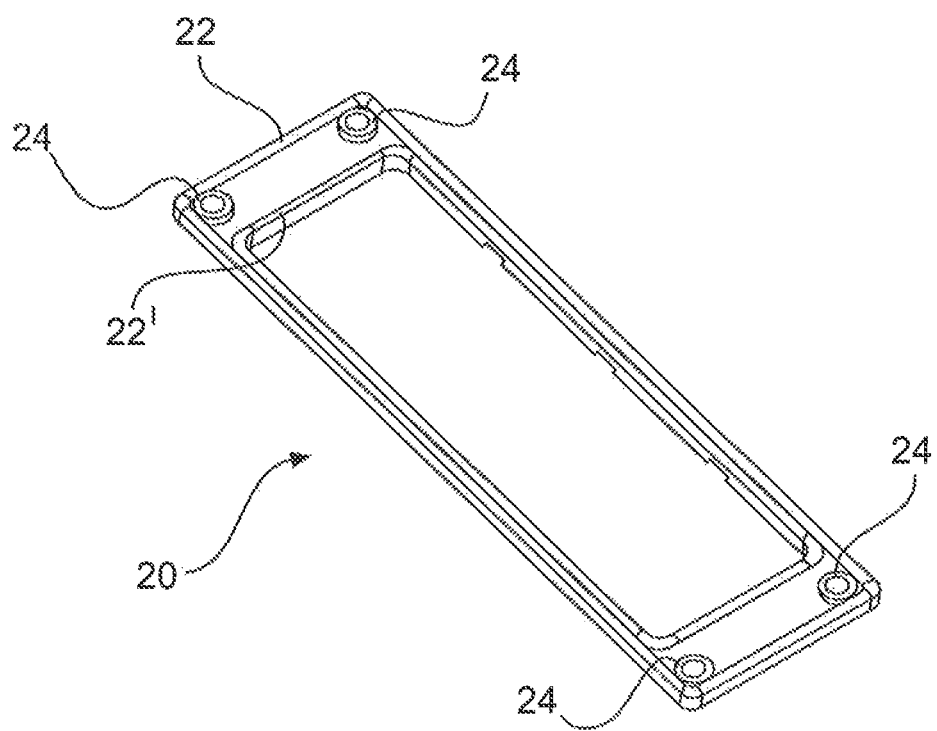
FIG. 3 shows a further sealing element from a further perspective.

FIG. 3 shows the sealing element 20 from FIG. 2 in a further three-dimensional view, however with a view towards the bottom side, which in the assembled condition of the plug-in connector housing 1 is in contact with the assembly surface 3.

The side of the sealing element 20 that faces away from the fastening flange 10 has two peripheral sealing lips 22, 22', a sealing lip 22' extending along the inner edge and a sealing lip 22 extending along the outer edge.

By virtue of the two continuous sealing lips 22, 22', a particularly good sealing is achieved between the sealing element 20 and an assembly surface 3.

In addition, the side of the sealing element 20 that is shown includes support rings 24. These are provided in the same number as the sealing sleeves 21 and are each accurately aligned with a sealing sleeve 21 on the opposite side of the sealing element 20.

The purpose of the support rings 24 is to support the sealing element 20 in the areas where the sealing sleeves 21 press against the flat sealing element 20 from the opposite side. This provides for compensation for the sealing lips 22, 22' that are moulded onto the sealing element 20. Accordingly, according to the invention the support rings 24 also have a height that corresponds to the height of the sealing lips 22, 22'.

Figure 4:
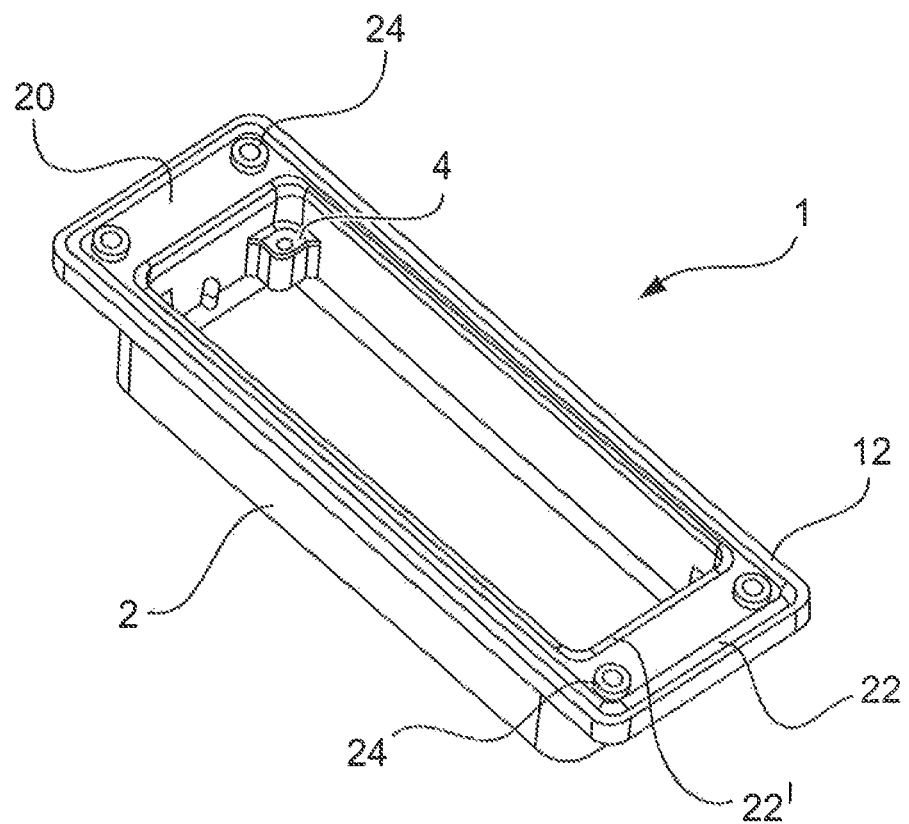
FIG. 4 shows a plug-in connector housing with a sealing element.

FIG. 4 shows a plug-in connector housing 1 with an inserted sealing element 20. The sealing element 20 is provided on the fastening flange 10 and is surrounded by the peripheral collar 12. The sealing sleeves 21 of the sealing element 20 are inserted into the fastening bores 11 (cannot be seen here, see FIG. 5).

Figure 5:
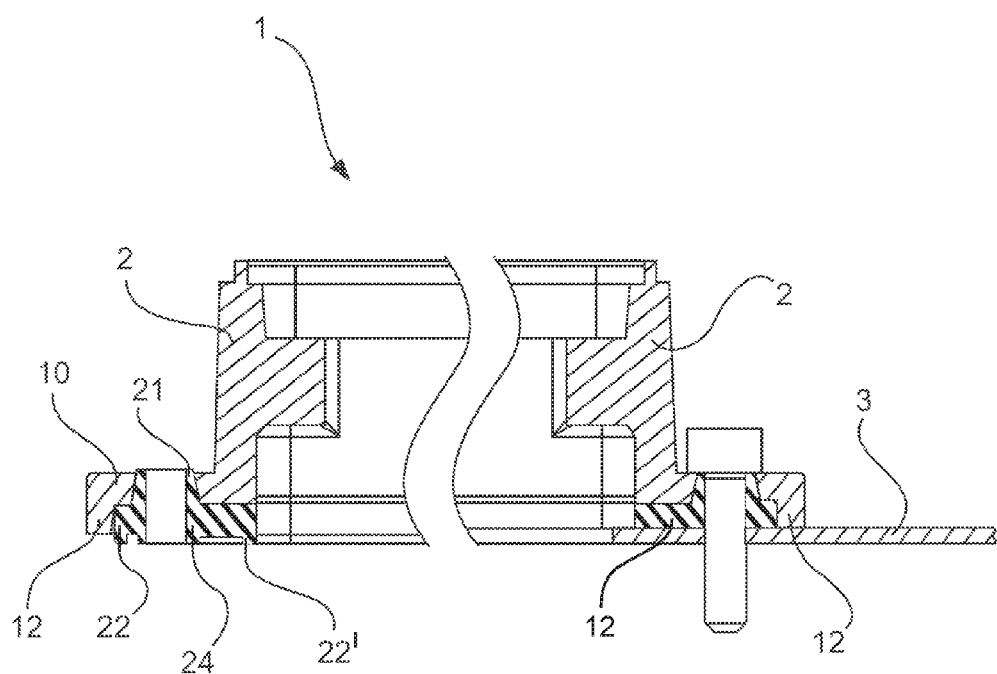
FIG. 5 shows a plug-in connector housing with a sealing element in a sectional view.

FIG. 5 finally shows a sectional view of the plug-in connector housing 1 according to the invention, wherein the left half shows a non-assembled condition and the right half shows the plug-in connector housing 1 mounted to an assembly surface 3 using a screw.

On the left-hand side in FIG. 5 it can be seen how a sealing sleeve 21 is inserted into a fastening bore 11. Here, the sealing sleeve 21 completely passes through the fastening bore 11 and protrudes, in the case of a completely inserted sealing element 20, beyond the fastening bore 11 (shown at the top here).

In this embodiment shown, both the fastening bore 11 and the sealing sleeves 21 are conically shaped. This embodiment ensures a particularly advantageous sealing function.

On the side of the sealing element 20 that is here shown at the bottom, the two sealing lips 22, 22' can be seen. In order to compensate the thicknesses of the to sealing lips 22, 22', the support ring 24 is provided below the sealing sleeve 21.

In the right-hand area of FIG. 5, the plug-in connector housing 1 is fixed to an assembly surface 3 by means of a screw.

The sealing element 20 is pressed together by the pressing force generated to such a degree that the plug-in connector housing sits on the collar 12. In doing so, the sealing lips 22, 22' provide a seal between the assembly surface 3 and the sealing element 20. At the same time, the sealing lip 22" seals the sealing element 20 against the fastening flange 10.

The projection of the sealing sleeve 21 beyond the fastening bore 11 according to the invention is compressed by the screw head in such a way that any ingress of environmental influences such as dust, dirt, liquids etc. is prevented on the screw head as well.

Environmentally Sealed Plug-in Connector Housing

LIST OF REFERENCE NUMERALS

1 Plug-in connector housing
2 Base body
3 Assembly surface
4 Fastening receptacle
10 Fastening flange
11 Fastening bore
12 Collar
13 Cam
20 Sealing element
21 Sealing sleeve
22 Sealing lip
23 Recess
24 Support ring

The invention claimed is:

1. A plug-in connector housing (1) comprising a base body (2) and
a fastening flange (10) molded onto the base body (2), said plug-in connector housing mountable to an assembly surface through said fastening flange (10),
wherein the fastening flange (10) has at least one fastening bore (11), and
wherein the fastening flange (10) has a side that faces away from the base body (2), wherein a sealing element (20) that approximately corresponds to the shape of the fastening flange (10) is received by and retained by the fastening flange (10) on the side that faces away from the base body (2),
wherein the sealing element (20) has at least one sleeve-shaped attachment molded thereon that forms a non-segmented sealing sleeve (21),
wherein the sealing sleeve (21) is provided in the fastening bore (11) of the fastening flange,
wherein the sealing sleeve (21) at least completely passes through the fastening bore (11), so that the sealing sleeve (21) protrudes from the fastening bore (11) in a non-mounted condition of the plug-in connector housing (1),
wherein the fastening bore (11) is tapered radially inward from the side of the fastening flange (10) that faces away from the base body (2) towards the a side of the fastening flange (10) that faces the base body (2).

2. The plug-in connector housing (1) according to claim 1,
wherein the at least one fastening bore (11) is conically tapered.

3. The plug-in connector housing (1) according to claim 2,
wherein an external contour of the sealing sleeve (21) has a conical shape that corresponds to a shape of the fastening bore (11).

4. The plug-in connector housing (1) according to claim 1,
wherein the fastening flange (10) has molded thereto a peripheral collar (12), wherein the peripheral collar (12) extends away from the base body (2).

5. The plug-in connector housing (1) according to claim 4,
wherein the peripheral collar (12) surrounds the sealing element (20).

6. The plug-in connector housing (1) according to claim 4,
wherein the peripheral collar (12) is thinner than the sealing element (20).

7. The plug-in connector housing (1) according to claim 1,
wherein the sealing element (20) has, on a side facing away from the fastening flange (10), at least one sealing lip (22) that extends in in a manner that corresponds to a shape of the sealing element (20).

8. The plug-in connector housing (1) according to claim 7,
wherein the sealing element (20) has two sealing lips (22, 22'), wherein a first sealing lip (22) extends along an outer edge of the sealing element (20) and a second sealing lip (22') extends along an inner edge of the sealing element (20).

9. The plug-in connector housing (1) according to claim 7,
wherein the sealing element (20) has molded thereon on the side facing away from the fastening flange (10) at least one support ring (24) that is located in an area of the sealing sleeve (21) that is provided on a side of the sealing element facing the fastening flange, wherein the support ring (24) has a diameter that approximately corresponds to a diameter of the sealing sleeve (21) and has a height that approximately corresponds to a height of the sealing lip (22).

10. The plug-in connector housing (1) according to claim 1,
wherein the fastening flange (10) has at least one projection (13) on the side facing away from the base body, wherein the at least one projection (13) engages in a corresponding recess (23) of the sealing element (20).

11. The plug-in connector housing (1) according to claim 1,
wherein the sealing element (20) is made from an elastic sealing material.

12. The plug-in connector housing (1) according to claim 1,
wherein the sealing sleeve (21) protrudes from the fastening bore (11) by 0.05 mm to 1.0 mm when the plug-in connector housing (1) is in a non-mounted condition.

* * * * *